United States Patent
Gregor et al.

(10) Patent No.: US 11,904,733 B2
(45) Date of Patent: Feb. 20, 2024

(54) LONGITUDINAL ADJUSTER AND VEHICLE SEAT

(71) Applicant: Keiper Seating Mechanisms Co., Ltd., Shanghai (CN)

(72) Inventors: Peter Gregor, Trencianske Stankovce (SK); Thorsten Schuermann, Odenthal (DE); Erik Sprenger, Wermelskirchen (DE); Juergen Stemmer, Remscheid (DE); Andrej Sulak, Podluzany (SK)

(*) Notice: Subject to any disclaimer, the term of this patent is extended or adjusted under 35 U.S.C. 154(b) by 132 days.

(21) Appl. No.: 17/596,429

(22) PCT Filed: Jun. 10, 2020

(86) PCT No.: PCT/EP2020/066113
§ 371 (c)(1),
(2) Date: Dec. 10, 2021

(87) PCT Pub. No.: WO2020/249624
PCT Pub. Date: Dec. 17, 2020

(65) Prior Publication Data
US 2022/0227260 A1 Jul. 21, 2022

(30) Foreign Application Priority Data

Jun. 14, 2019 (DE) .................... 10 2019 116 315.3
Aug. 27, 2019 (DE) .................... 10 2019 122 928.6

(51) Int. Cl.
*B60N 2/06* (2006.01)
*B60N 2/07* (2006.01)
*B60N 2/02* (2006.01)

(52) U.S. Cl.
CPC ........... *B60N 2/067* (2013.01); *B60N 2/0705* (2013.01); *B60N 2/02253* (2023.08)

(58) Field of Classification Search
CPC .............. B60N 2/067; B60N 2/0705; B60N 2002/0236; B60N 2002/024; F16H 25/20
USPC ...................................................... 248/429
See application file for complete search history.

(56) References Cited

FOREIGN PATENT DOCUMENTS

| DE | 69620623 T2 | 12/2002 |
|---|---|---|
| DE | 102004036735 A1 | 3/2005 |
| DE | 102005023095 A1 | 12/2005 |
| DE | 102006000193 A1 | 10/2006 |

(Continued)

OTHER PUBLICATIONS

European Patent Office, International Search Report and Written Opinion in Application No. PCT/EP2020/066113, dated Sep. 8, 2020, 14 pages, Rijswijk Netherlands.

(Continued)

*Primary Examiner* — Kimberly T Wood
(74) *Attorney, Agent, or Firm* — Marshall & Melhorn, LLC

(57) ABSTRACT

A longitudinal adjuster for a vehicle seat may have at least one pair of rails which is formed from a first rail and a second rail. A spindle nut may be connected to the second rail and a spindle operatively connected to the spindle nut are located in the inner channel. A spindle gear, which can be driven a motor and interacts with the spindle, may be located at one end of the first rail. The spindle nut may be fixed to the second rail so that the spindle nut has a degree of freedom of at least one. The spindle nut may be fixedly connected to the second rail by a fixing device. A projection may be provided between a base body of the spindle nut and the second rail. The invention also relates to a vehicle seat with the longitudinal adjuster.

14 Claims, 6 Drawing Sheets

(56) References Cited

FOREIGN PATENT DOCUMENTS

| | | |
|---|---|---|
| DE | 102008024141 A1 | 11/2009 |
| DE | 10201401582 A1 | 7/2015 |
| JP | 2008056003 A | 8/2006 |
| JP | 2008222034 A | 9/2008 |
| WO | 2008070646 A2 | 6/2008 |

OTHER PUBLICATIONS

German Patent and Trademark Office, Office Action in Application No. DE 10 2019 122 928.6, dated Jan. 29, 2020, 5 pages, Munich Germany.

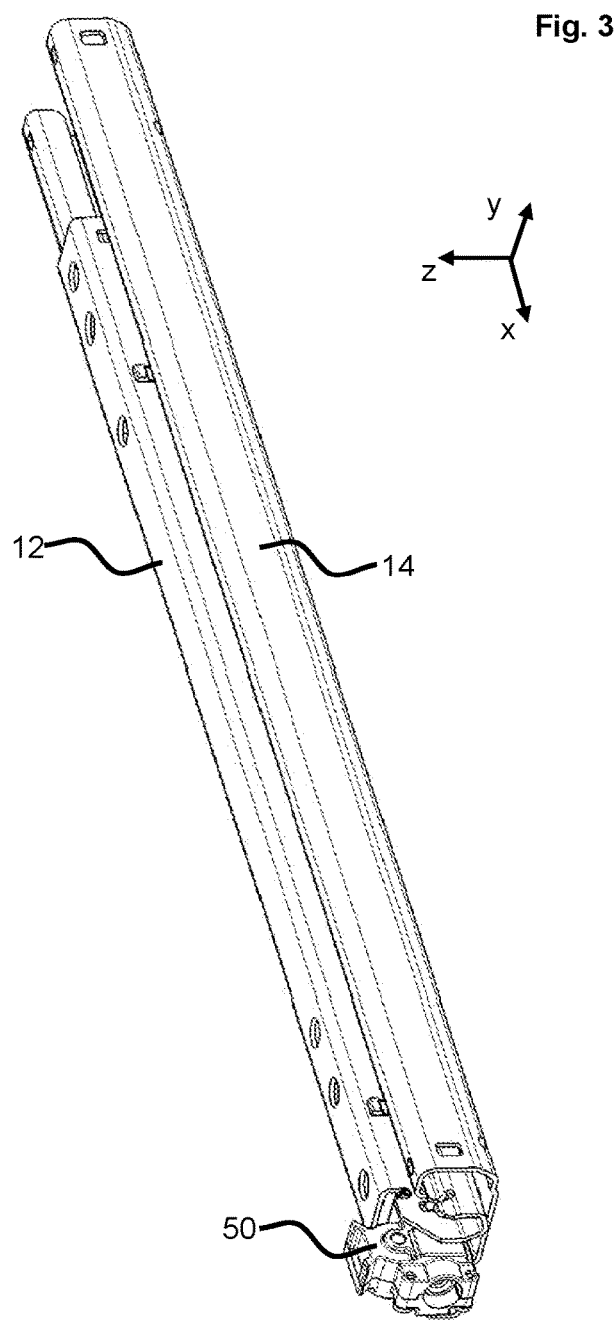
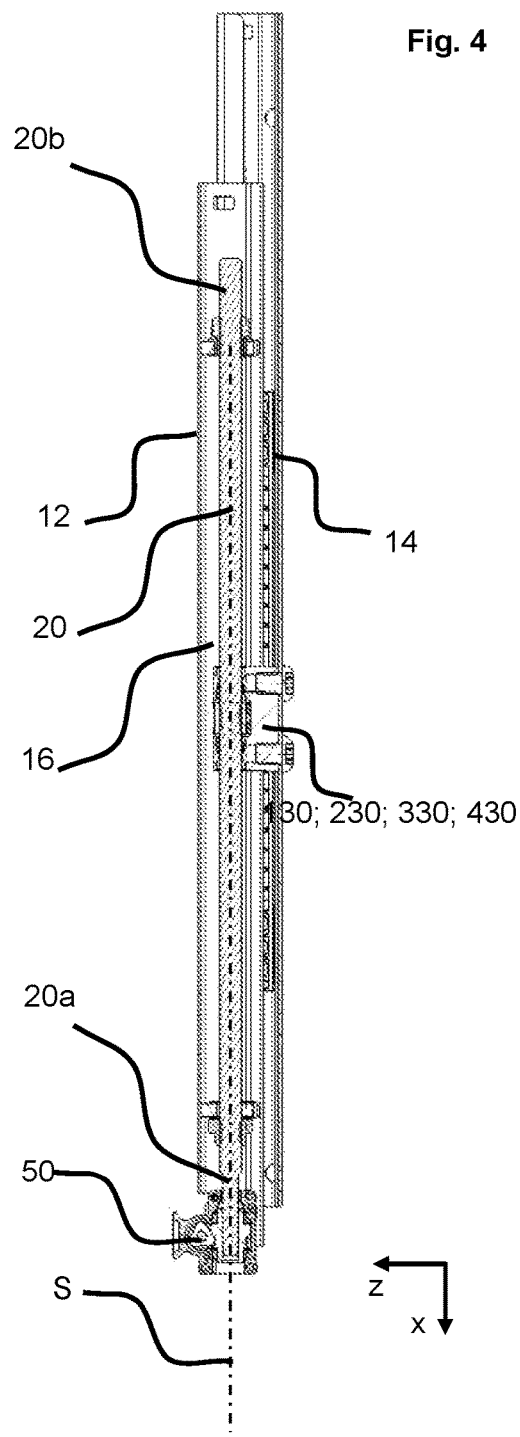
Fig. 3
Fig. 4

LONGITUDINAL ADJUSTER AND VEHICLE SEAT

FIELD

The invention relates to a longitudinal adjuster, in particular for a vehicle seat, the longitudinal adjuster having at least one pair of rails formed from a first rail and a second rail which is displaceable in the longitudinal direction relative to the first rail, wherein the rails alternately engage around each other forming an inner channel, wherein a spindle nut connected to the second rail and a spindle operatively connected to the spindle nut are arranged in the inner channel, wherein a gear which is drivable by means of a motor and interacts with the spindle is arranged at one end of the first rail. The invention furthermore relates to a vehicle seat.

BACKGROUND

A drive device of the type in question for a motor vehicle seat in a sliding device is known from DE 10 2005 023 095 A1. The drive device for use with a motor vehicle seat sliding device comprises mating fixed and movable rail parts that can be moved between a front position and a rear position. The drive device comprises an elongated spindle, a spindle nut, a gear and a mounting device. The spindle defines a spindle axis and has a spindle thread extending in the longitudinal direction. The spindle nut can be securely fastened to a first rail part and has an internal thread that can engage in the spindle thread. The gear can be mounted on a different rail part and selectively rotates the spindle around the spindle axis. The spindle of the drive device is provided with a spindle wheel which, in the mounted state of the drive device, extends outward through spindle wheel openings in the movable rail part.

A seat sliding device which has a system with a floating threaded spindle and a static nut is known from DE 10 2006 000 193 A1. The nut is fastened to the lower rail while the threaded spindle rotates through it, such that the upper structure can move forward and backward. When this system is used, the nut is fastened to the lower rail.

DE 10 2008 024 141 A1 discloses a spindle bearing arrangement for a seat longitudinal adjustment mechanism, said spindle bearing arrangement having a housing which is fastenable by a fastening arrangement to a component on the vehicle side or to a component on the seat side, wherein a spindle opening for the passage of a spindle along a spindle opening axis passes through the housing, and wherein an internal thread in the housing in the region of its spindle opening is designed for engaging in a spindle passed through in this way, in order to adjust the housing and the spindle relative to one another along the spindle opening axis. The spindle bearing arrangement provides that the internal thread is formed in a spindle nut and the spindle nut is mounted in the housing so as to be adjustable relative to the spindle opening axis.

A similar bearing arrangement is known from DE 696 20 623 T2 and DE 10 2004 036 735 B4.

An alternative drive device for a motor vehicle seat is known from DE 10 2014 201 582 A1, said drive device having a spindle held non-rotatably in a first rail fixed to the vehicle in conjunction with a driven spindle gear held in a second rail fixed to the seat. Such drive devices do not have a static spindle nut.

SUMMARY

The invention is based on the problem of improving a longitudinal adjuster of the type mentioned at the beginning, in particular of providing a longitudinal adjuster with a static spindle nut, which enables elimination of play and tolerance compensation in the region of the spindle nut, and to provide a corresponding vehicle seat.

According to the invention, this problem is solved by a longitudinal adjuster, in particular for a vehicle seat, the longitudinal adjuster having at least one pair of rails formed from a first rail and a second rail which is displaceable in the longitudinal direction relative to the first rail, wherein the rails alternately engage around each other forming an inner channel, wherein a spindle nut connected to the second rail and a spindle operatively connected to the spindle nut are arranged in the inner channel, wherein a gear which is drivable by means of a motor and interacts with the spindle is arranged at one end of the first rail, wherein the spindle nut is fixed to the second rail in such a way that the spindle nut has a degree of freedom of at least one, wherein the spindle nut is connected, in particular fixedly connected, to the second rail by means of a fixing means, wherein a projection is provided in the region of the fixing means on a basic body of the spindle nut or on the second rail, which projection defines a distance between the basic body and the second rail, wherein the spindle nut is connectable to the second rail in the event of a crash by means of at least one crash bolt, in particular two crash bolts.

Since the spindle nut is fixed to the second rail in such a way that the spindle nut has a degree of freedom of at least one, manufacturing-related tolerances and play between the individual components, in particular during assembly, can be compensated for.

The fact that the "fixing means is fixedly connected to the second rail" is generally to be understood as meaning that the fixing means secures the spindle nut at least in a normal state of use of the longitudinal adjuster in a manner free from play relative to the second rail, but without influencing the degree of freedom.

Advantageous refinements which can be used individually or in combination with one another are the subject matter of the dependent claims.

The first rail is preferably a seat rail which is connectable to a vehicle seat. The second rail is preferably a floor rail which is connectable to a vehicle structure. A possible internal structure and the manner of operation and function of the spindle gear is known, for example, from DE 10 2013 207 665 A1, the disclosure in respect of which is hereby expressly included.

The spindle can be mounted at a front end section of the spindle in the spindle gear and at a rear end section of the spindle in a rotary bearing of the first rail.

The crash bolts can be screws. The crash bolts can be threaded bolts. The crash bolts can each be passed through a first opening, in particular for the crash bolts, in the second rail. Furthermore, a radial gap can be provided around each crash bolt, between the bolt and the second rail, in particular between the bolt and the first openings in the second rail.

The spindle nut can have a basic body. The spindle nut can have a continuous threaded bore with an internal thread, in particular parallel to the longitudinal direction. The internal thread of the spindle nut can be operatively connected to an external thread of the spindle.

The basic body of the spindle nut can have a shoulder in the region of each of the crash bolts, which shoulder defines a distance between a head of the respective crash bolt and the basic body. Here, a gap can be provided around the shoulder, between the shoulder and the second rail, in particular between the shoulder and the first openings in the second rail.

Likewise, the crash bolts can each have a shoulder which adjoins a head of the respective crash bolt and defines a distance between the head and the spindle nut, in particular the basic body of the spindle nut.

The spindle nut can be fixedly connected to the second rail by means of a centrally arranged fixing means, as viewed in the longitudinal direction. The second rail can have a second opening for this purpose. An inner diameter of the second opening is preferably adapted to an outer diameter of the fixing means. The fixing means can be a screw. The fixing means can be a bolt, in particular a threaded bolt.

A projection, in particular parallel to a spindle axis and preferably centrally arranged, can be provided on the basic body of the spindle nut in the region of the fixing means, which projection defines a distance between the basic body and the second rail, in particular an upper side of the second rail oriented in the direction of the inner channel. In the region of the spindle nut, the second rail can have a projection which defines a distance between the spindle nut and the second rail, in particular an upper side of the second rail oriented in the direction of the inner channel. The projection of the second rail can be produced by means of an embossing. A bearing element can be arranged between the basic body of the spindle nut and the second rail. The bearing element can be a plain washer. The bearing element can be a metal sheet. The bearing element can have a projection, in particular a projection arranged centrally parallel to the spindle axis. The bearing element can define a distance between the basic body and the second rail.

The degree of freedom can correspond to a pivoting of the spindle nut about a substantially horizontal axis. The degree of freedom can correspond to a pivoting of the spindle nut about an axis running substantially horizontally and parallel to a transverse direction. In this way, due to high loads in crash situations, it can advantageously be made possible for the spindle nut to be tiltable or pivotable, in particular about a contact region between the projection and the second rail. The second rail can preferably be made of metal, in particular spring steel. The second rail can have resilient properties of a spring sheet in some regions.

The degree of freedom can correspond to a rotation of the spindle nut about a substantially vertical axis, in particular an axis of the fixing means. The degree of freedom can correspond to a movement of the spindle nut in a vertical direction. The degree of freedom can correspond to a pivoting of the spindle nut about a substantially horizontal axis, in particular along an imaginary connecting line between the two crash bolts. A "degree of freedom" in the context of the present invention is generally understood to mean a number of mutually independent movement possibilities.

An elastic means can be arranged between the basic body of the spindle nut and the second rail. A metal spring, in particular a metallic leaf spring, can be arranged between the basic body of the spindle nut and the second rail. A buffer, in particular a flat buffer, made of a plastic, in particular a rubber, can be arranged between the basic body of the spindle nut and the second rail. A buffer, in particular an annular buffer, made of a plastic, in particular a rubber, can be arranged between the head of each of the crash bolts and the second rail.

The buffer can be made of a plastic, in particular a rubber. The buffer can be made of metal. The buffer can be made of metal on the one hand and plastic or rubber on the other hand. One side of the buffer can be made of metal and another side of the buffer can be made of plastic and/or rubber.

A diameter of the spindle can be increased compared to spindles known from the prior art. The spindle nut is preferably designed in one piece. The spindle nut can advantageously enable a reduction in play or a compensation for manufacturing tolerances.

The problem is also solved according to the invention by a vehicle seat with a longitudinal adjuster described above.

DESCRIPTION OF THE FIGURES

Before refinements of the invention are described in more detail below with reference to figures, it should first be noted that the invention is not limited to the components described. Furthermore, the terminology used does not constitute a restriction, but is merely of an exemplary nature. Insofar as the singular is used in the description and the claims below, the plural is also included, unless the context explicitly excludes this.

The invention is explained in more detail below on the basis of advantageous exemplary embodiments which are illustrated in the figures. The invention is however not limited to these exemplary embodiments. In the figures.

DETAILED DESCRIPTION

Figure 1:
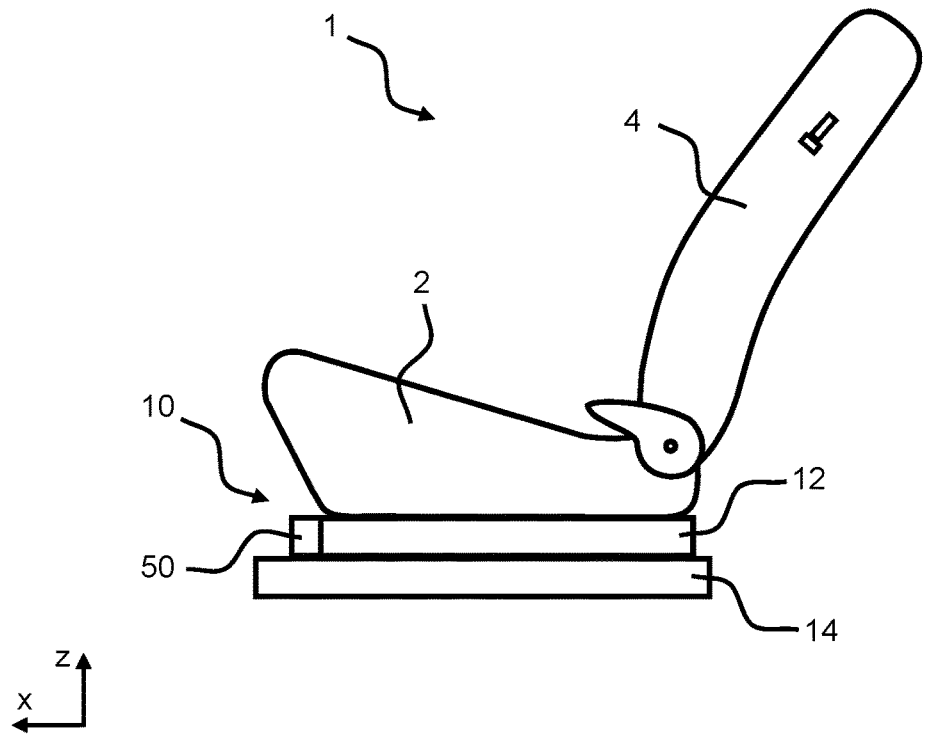
FIG. 1: shows schematically a vehicle seat according to the invention.

A vehicle seat 1 illustrated schematically in FIG. 1 is described below using three spatial directions running perpendicular to one another. In the case of a vehicle seat 1 installed in the vehicle, a longitudinal direction x runs substantially horizontally and preferably parallel to a vehicle longitudinal direction, which corresponds to the normal direction of travel of the vehicle. A transverse direction y, which runs perpendicularly with respect to the longitudinal direction x, is likewise oriented horizontally in the vehicle, and runs parallel to a vehicle transverse direction. A vertical direction z runs perpendicularly with respect to the longitudinal direction x and perpendicularly with respect to the transverse direction y. In the case of a vehicle seat 1 installed in the vehicle, the vertical direction z runs parallel to the vehicle vertical axis.

The positional and directional indications used, such as for example front, rear, top and bottom, relate to a viewing direction of an occupant sitting in the vehicle seat 1 in a normal sitting position, wherein the vehicle seat 1 is installed in the vehicle, in a use position suitable for passenger transport, with an upright backrest 4, and is oriented in the conventional manner in the direction of travel. The vehicle seat 1 may however also be installed in a different orientation, for example transversely with respect to the direction of travel.

The vehicle seat 1 shown in FIG. 1 for a motor vehicle has a seat part 2 and the backrest 4 which is adjustable in its inclination relative to the seat part 2. An inclination of the backrest 4 can be adjustable, for example, by means of a latching fitting or a geared fitting. The vehicle seat 1 is mounted on a longitudinal adjuster 10 for adjusting a longitudinal seat position.

Figure 2:
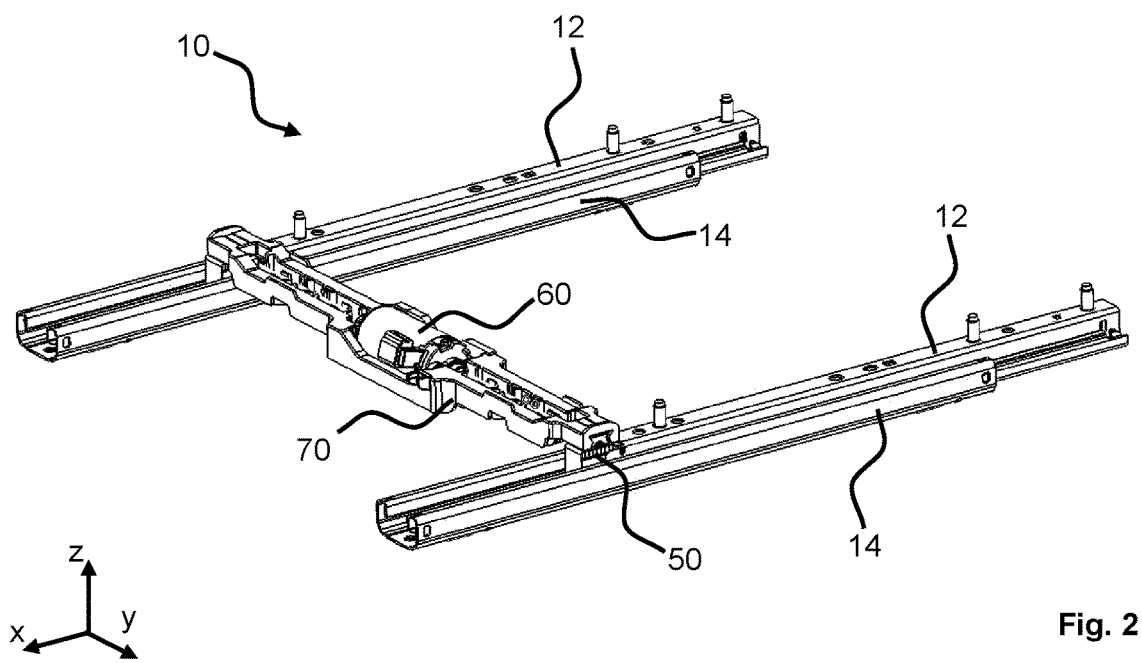
FIG. 2: shows a longitudinal adjuster according to the invention of the vehicle seat from FIG. 1, FIG. 3: shows a perspective view of a pair of rails of the longitudinal adjuster from FIG. 2, FIG. 4: shows a longitudinal section of the pair of rails from FIG. 3, FIG. 5: shows a perspective illustration, enlarged in detail, of a spindle nut according to a first exemplary embodiment.

FIG. 2 shows the longitudinal adjuster 10 according to the invention of the vehicle seat 1. The longitudinal adjuster 10 has at least one pair of rails, in the present case two pairs of rails. FIG. 3 shows one of the pairs of rails of the longitudinal adjuster 10 from FIG. 2.

The pairs of rails are each formed from a first rail 12, in particular for connection to a seat structure of the vehicle seat 1, and from a second rail 14, in particular for connection to a vehicle structure. The rails 12, 14 of the pair of rails are displaceable in the longitudinal direction x relative to one another and engage alternately around one another forming an inner channel 16. A spindle nut 130; 230; 330; 430, which is mounted on the second rail 14 and in the present case is connected, in particular non-rotatably, to the second rail 14, and a spindle 20 interacting with the spindle nut 130; 230; 330; 430 are arranged in the inner channel 16. The spindle 20 extends along a spindle axis S parallel to the longitudinal direction x. A spindle gear 50 which is drivable by means of a motor 60 and which drives the spindle 20 is arranged at a front end of the first rail 12. The motor 60 is held on a motor carrier 70 mounted between the two spindle gears 50 of the respective pairs of rails and drives the two spindle gears 50 by means of a shaft, not illustrated in FIG. 2.

FIG. 4 shows a longitudinal section of the pair of rails from FIG. 3. The spindle gear 50 supports a front end section 20a of the spindle 20. The spindle nut 130; 230; 330; 430 is arranged centrally along the length of the spindle 20 in the state illustrated here. By rotation of the spindle 20 about the spindle axis S, the spindle nut 130; 230; 330; 430 is screwed, depending on the direction of rotation, along an external thread of the spindle 20 in or counter to the longitudinal direction x and thereby displaces the first seat rail 12 relative to the second seat rail 14. A relative position between the spindle 10 and the spindle nut 130; 230; 330; 430 is also displaced accordingly.

Figure 5:
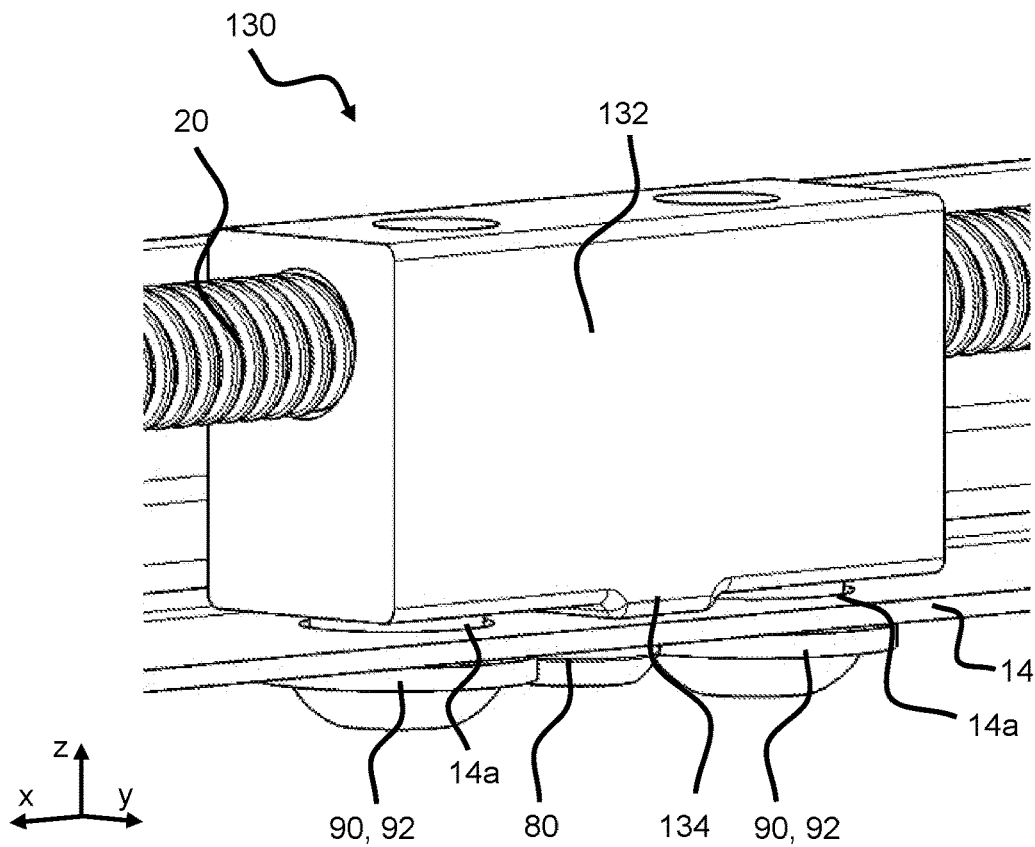
Figure 6:
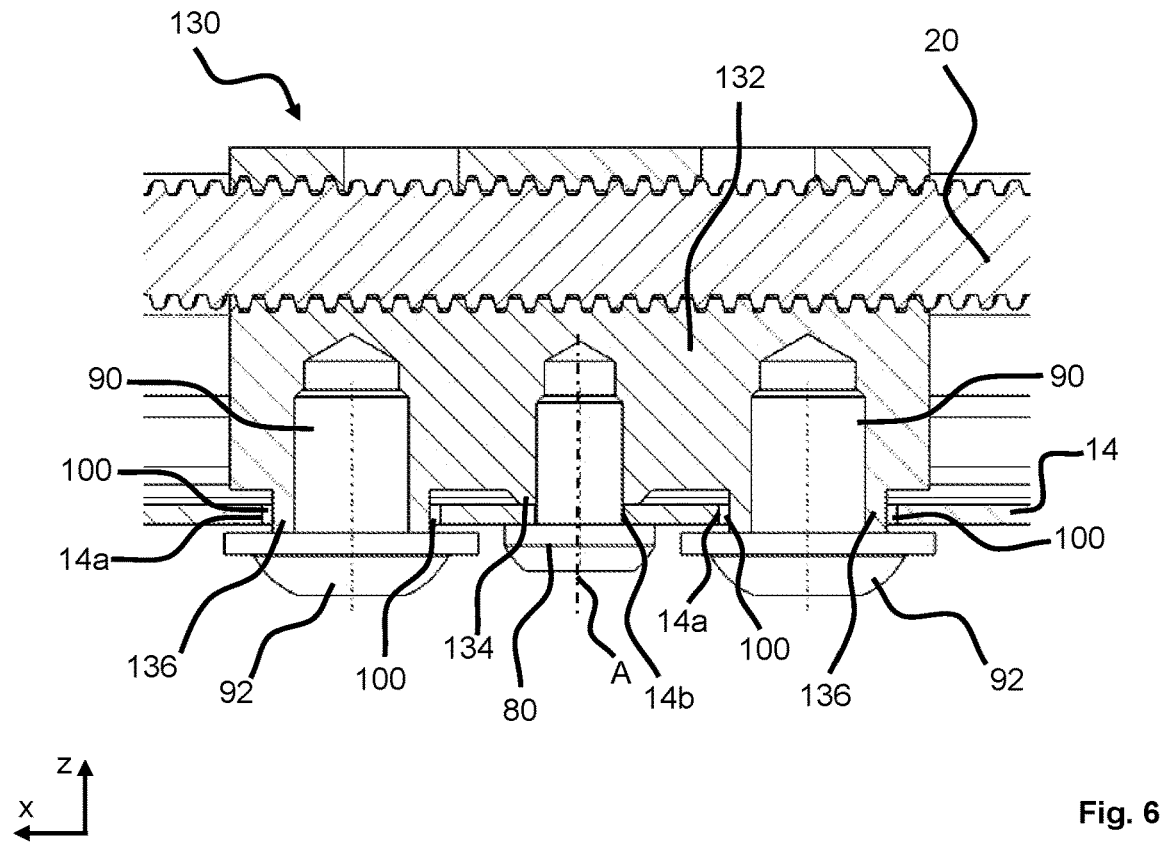
FIG. 6: shows a longitudinal section of the spindle nut from FIG. 5, FIG. 7: shows a perspective illustration, enlarged in detail, of a spindle nut according to a second exemplary embodiment.

FIGS. 5 and 6 show the spindle nut 130 according to a first exemplary embodiment. The spindle nut 130 has a basic body 132. The spindle nut 130 has a continuous threaded bore which is oriented in particular parallel to the longitudinal direction x and has an internal thread. The internal thread of the spindle nut 130 is operatively connected to an external thread of the spindle 20.

The spindle nut 130 is connected to the second rail 14 by means of two crash bolts 90. For this purpose, the second rail 14 has two first openings 14a, through each of which a crash bolt 90 is passed. Furthermore, a gap 100 is provided around the crash bolts 90, between the bolts and the second rail 14. The spindle nut 130 is fixedly connected to the second rail 14 by means of a fixing means 80, in particular a fixing means 80 arranged centrally between the crash bolts 90, as viewed in the longitudinal direction x. For this purpose, the second rail 14 has a second opening 14b for the fixing means 80. The inner diameter of the second opening 14b is adapted to an outer diameter of the fixing means 80. The spindle nut 130 has a projection 134 on the basic body 132 in the region of the fixing means 80, which projection defines a distance between the basic body 132 and the second rail 14. The spindle nut 130 can, preferably in the event of a crash, be pivotable about a substantially horizontal axis, in particular about an axis running parallel to a transverse direction y.

According to the first exemplary embodiment, a shoulder 136 is arranged, in particular integrally formed, on the basic body 132 of the spindle nut 130 in the region of each of the crash bolts 90 and defines a distance between a head 92 of the respective crash bolt 90 and the basic body 132. In the present case, the head 92 is normally spaced apart from the second rail 14 and only comes into contact with the second rail 14 after the longitudinal adjuster 10 has been deformed under load, in particular in the event of a crash.

In the present case, one possibility of movement of the spindle nut 130 corresponding to a degree of freedom is a rotation of the spindle nut 130 about a substantially vertical axis, in particular an axis A of the fixing means 80. In the region of the crash bolts 90, the second rail 14 can also move to a limited extent in the vertical direction z between the head 92 and the spindle nut 130.

Figure 7:
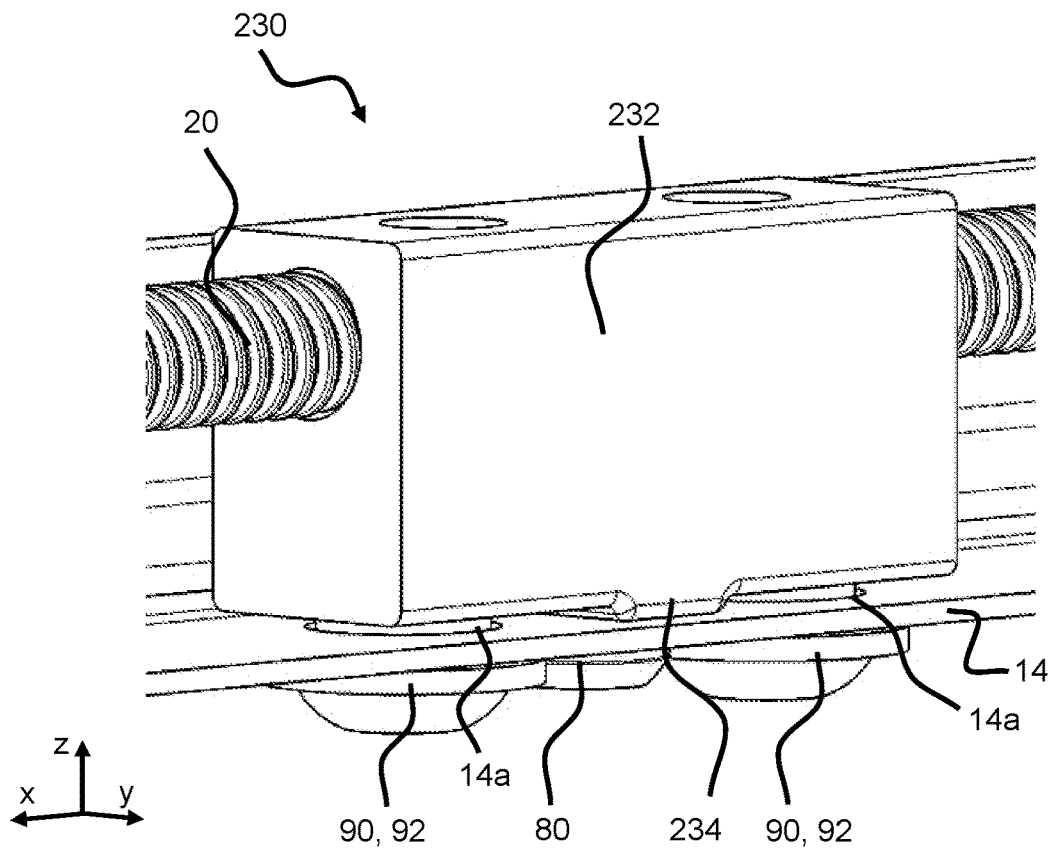
Figure 8:
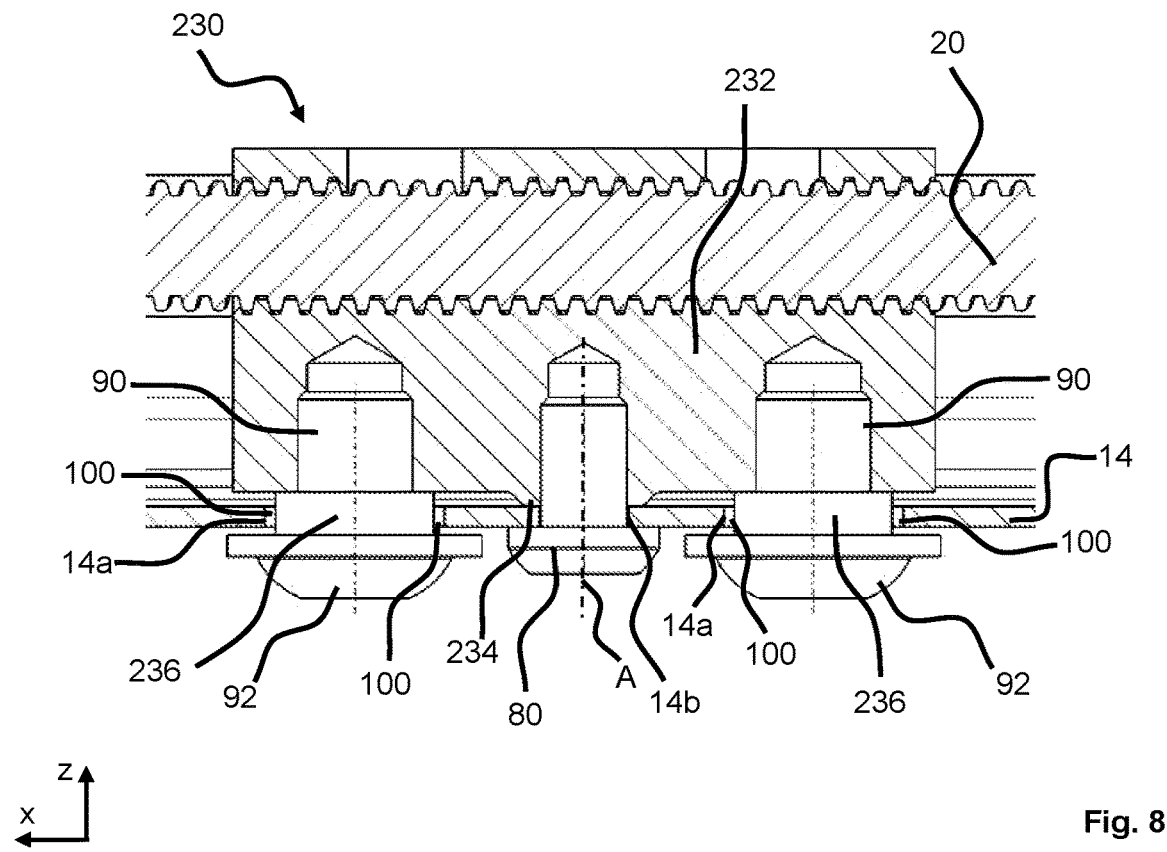
FIG. 8: shows a longitudinal section of the spindle nut from FIG. 7, FIG. 9: shows a perspective illustration, enlarged in detail, of a spindle nut according to a third exemplary embodiment.

FIGS. 7 and 8 show the spindle nut 230 according to a second embodiment. The spindle nut 230 has a basic body 232. The spindle nut 230 has a continuous threaded bore which is oriented in particular parallel to the longitudinal direction x and has an internal thread. The internal thread of the spindle nut 230 is operatively connected to an external thread of the spindle 20.

The spindle nut 230 is connected to the second rail 14 by means of two crash bolts 90. For this purpose, the second rail 14 has two first openings 14a, through each of which a crash bolt 90 is passed. Furthermore, a gap 100 is provided around the crash bolts 90, between the bolts and the second rail 14. The spindle nut 230 is fixedly connected to the second rail 14 by means of a fixing means 80, in particular a fixing means 80 arranged centrally, as viewed in the longitudinal direction x. For this purpose, the second rail 14 has a second opening 14b for the fixing means 80. The inner diameter of the second opening 14b is adapted to an outer diameter of the fixing means 80. The spindle nut 230 has a projection 234 on the basic body 232 in the region of the fixing means 80, which projection defines a distance between the basic body 232 and the second rail 14. The spindle nut 230 can, preferably in the event of a crash, be pivotable about a substantially horizontal axis, in particular about an axis running parallel to a transverse direction y.

According to the second exemplary embodiment, the crash bolts 90 each have a shoulder 236 adjoining a head 92 of the respective crash bolt 90, which shoulders 236 each define a distance between the head 92 and the spindle nut 230. In the present case, the head 92 is normally spaced apart from the second rail 14 and only comes into contact with the second rail 14 after the longitudinal adjuster 10 has been deformed under load, in particular in the event of a crash.

In the present case, one possibility of movement of the spindle nut 230 corresponding to a degree of freedom is a rotation of the spindle nut 230 about a substantially vertical axis, in particular an axis A of the fixing means 80. In the region of the crash bolts 90, the second rail 14 can also move to a limited extent in the vertical direction z between the head 92 and the spindle nut 230.

Figure 9:
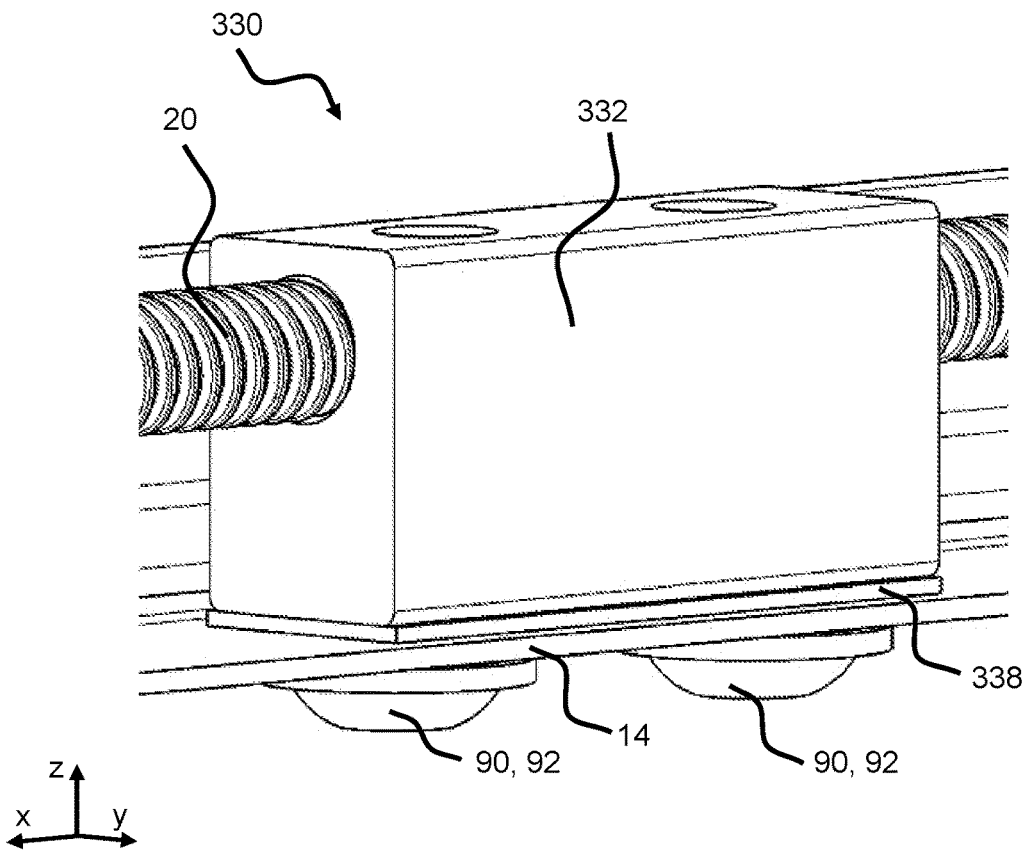
Figure 10:
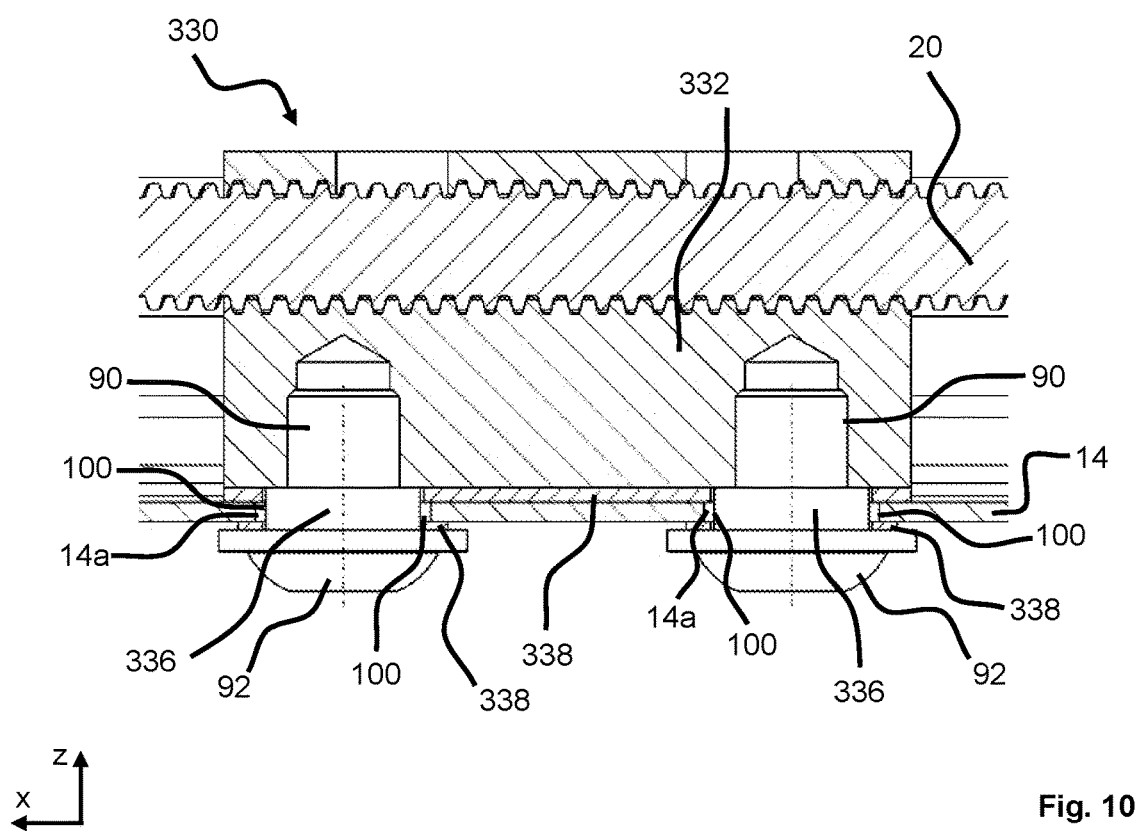
FIG. 10: shows a longitudinal section of the spindle nut from FIG. 9, FIG. 11: shows a perspective illustration, enlarged in detail, of a spindle nut according to a fourth exemplary embodiment.

FIGS. 9 and 10 show the spindle nut 330 according to a third embodiment. The spindle nut 330 has a basic body 332. The spindle nut 330 has a continuous threaded bore which is oriented in particular parallel to the longitudinal direction x and has an internal thread. The internal thread of the spindle nut 330 is operatively connected to an external thread of the spindle 20.

The spindle nut 330 is connected to the second rail 14 by means of two crash bolts 90. For this purpose, the second rail 14 has two first openings 14a, through each of which a crash bolt 90 is passed. Furthermore, a gap 100 is provided around the crash bolts 90, between the bolts and the second rail 14. The crash bolts 90 each have a shoulder 336 adjoining a head 92 of the respective crash bolt 90, which shoulders 336 each define a distance between the head 92 and the spindle nut 330. In the present case, the head 92 is normally spaced apart from the second rail 14 and only comes into contact with the second rail 14 after the longitudinal adjuster 10 has been deformed under load, in particular in the event of a crash.

An elastic means 338 is arranged between the basic body 332 of the spindle nut 330 and the second rail 14. In the present case, the elastic means 338 is a buffer 338, in particular a flat buffer 338, made of a plastic, in particular a rubber. A further buffer 338, in particular an annular buffer 338, made of a plastic, in particular a rubber, is arranged between the head 92 of each of the crash bolts 90 and the second rail 14.

In the present case, one possibility of movement of the spindle nut 330 corresponding to a degree of freedom is a rotation of the spindle nut 330 about a substantially vertical axis which is limited by a respective position of the crash bolts 90 in the first openings 14a in the second rail 14.

Another possibility of movement of the spindle nut 330 corresponding to the degree of freedom can be a movement of the spindle nut 330 in the vertical direction z, which is influenceable by the elastic properties of the material of the buffers 338.

Another possibility of movement of the spindle nut 330 corresponding to the degree of freedom can be a pivoting of the spindle nut 330 about a substantially horizontal axis, in particular along an imaginary connecting line between the two crash bolts 90, which is also influenceable by the elastic properties of the material of the buffers 338.

Figure 11:
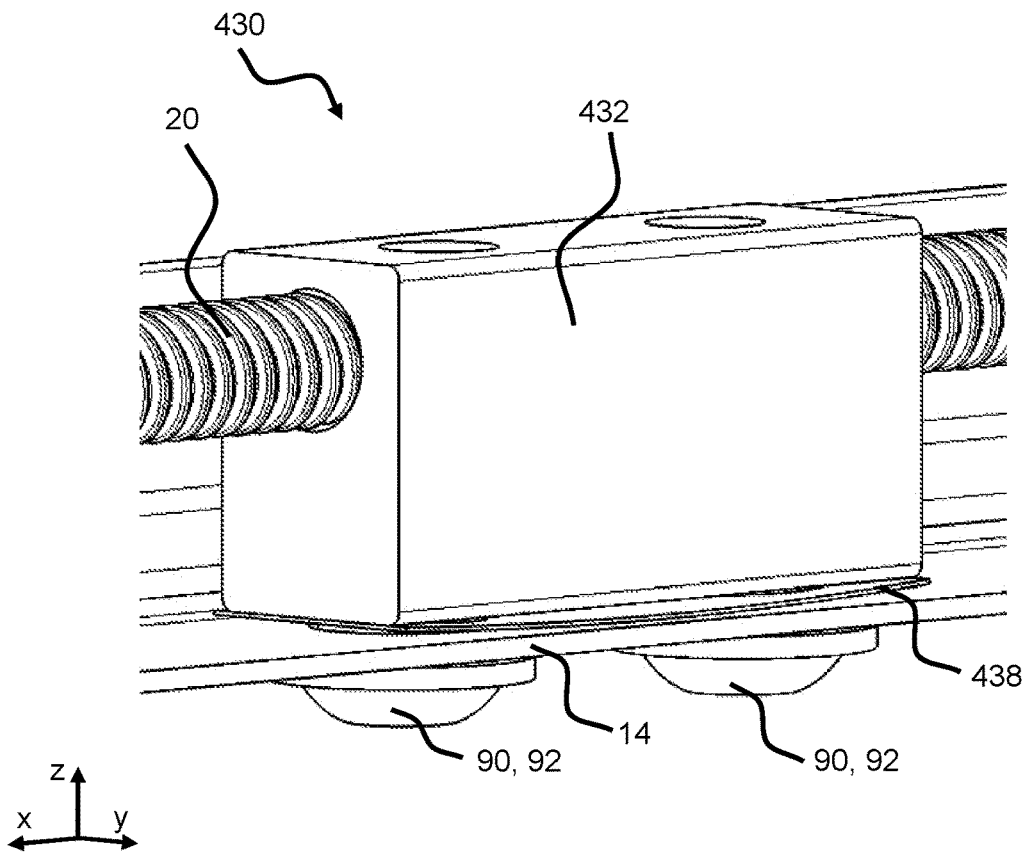
Figure 12:
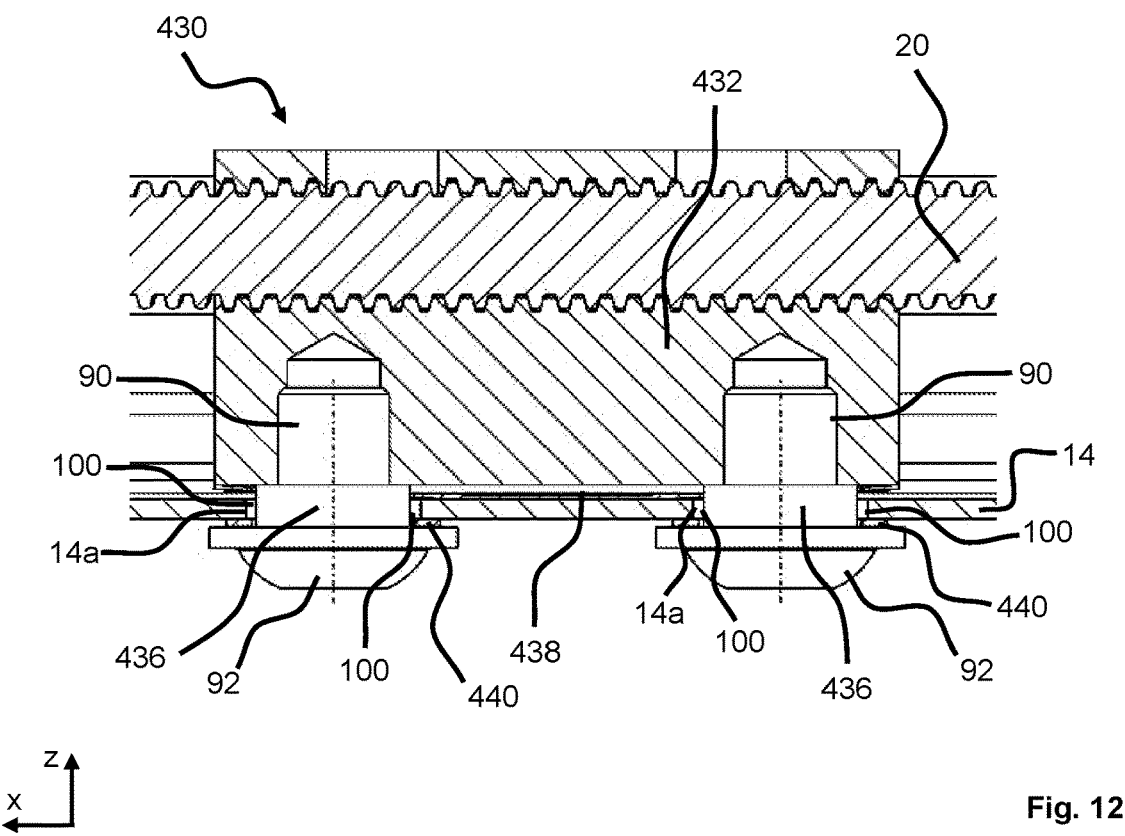
FIG. 12: shows a longitudinal section of the spindle nut from FIG. 11.

FIGS. 11 and 12 show the spindle nut 30 according to a fourth exemplary embodiment. The spindle nut 430 has a basic body 432. The spindle nut 430 has a continuous threaded bore which is oriented in particular parallel to the longitudinal direction x and has an internal thread. The internal thread of the spindle nut 430 is operatively connected to an external thread of the spindle 20.

The spindle nut 430 is connected to the second rail 14 by means of two crash bolts 90. For this purpose, the second rail 14 has two first openings 14a, through each of which a crash bolt 90 is passed. Furthermore, a gap 100 is provided around the crash bolts 90, between the bolts and the second rail 14. The crash bolts 90 each have a shoulder 436 adjoining a head 92 of the respective crash bolt 90, which shoulders 336 each define a distance between the head 92 and the spindle nut 430. In the present case, the head 92 is normally spaced apart from the second rail 14 and only comes into contact with the second rail 14 after the longitudinal adjuster 10 has been deformed under load, in particular in the event of a crash.

An elastic means is arranged between the basic body 432 of the spindle nut 430 and the second rail 14. A metal spring 438, in particular a metallic leaf spring 438, can be arranged between the basic body 432 of the spindle nut 430 and the second rail 14. A respective buffer 440, in particular an annular buffer 440, can be arranged between the head 92 of each of the crash bolts 90 and the second rail 14. In the present case, the buffer 440 is made of metal.

Alternatively, the buffer 440 can be made of metal on the one hand and plastic or rubber on the other hand. One side of the buffer 440 facing the head 92 can be made of metal and a side of the buffer 440 facing the second rail 14 can be made of plastic and/or rubber. Alternatively, a side of the buffer 440 facing the second rail 14 can be made of metal and a side of the buffer 440 facing the head 92 can be made of plastic and/or rubber.

In the present case, one possibility of movement of the spindle nut 430 corresponding to a degree of freedom is a rotation of the spindle nut 430 about a substantially vertical axis which is limited by a respective position of the crash bolts 90 in the first openings 14a in the second rail 14.

Another possibility of movement of the spindle nut 430 corresponding to the degree of freedom can be a movement of the spindle nut 430 in the vertical direction z, which is influenceable by the elastic properties of the material of the metal spring 438.

Another possibility of movement of the spindle nut 430 corresponding to the degree of freedom can be a pivoting of the spindle nut 430 about a substantially horizontal axis, in particular along an imaginary connecting line between the two crash bolts 90, which is also influenceable by the elastic properties of the material of the metal spring 438 and is limited by the dimensions of the first openings 14a and the heads 92 of the crash bolts 90.

The features which are disclosed in the description above, in the claims, and in the figures may be of importance, both individually and in combination, for the implementation of the invention in its various configurations.

Although the invention has been described in detail in the figures and in the above illustration, the illustrations should be understood as being illustrative and by way of example and not as restrictive. In particular, the selection of the graphically illustrated proportions of the individual elements should not be interpreted as being required or limiting. Furthermore, the invention is in particular not limited to the exemplary embodiments discussed. Further variants of the invention and the implementation thereof are apparent to a person skilled in the art from the preceding disclosure, from the figures and from the claims.

Terms such as "comprise", "have", "include", "contain" and the like used in the claims do not rule out further elements or steps. The use of the indefinite article does not rule out a plurality. A single device can perform the functions of a plurality of units or devices mentioned in the claims.

LIST OF REFERENCE SIGNS

1 Vehicle seat
2 Seat part
4 Backrest
10 Longitudinal adjuster
12 First rail
14 Second rail
14a First opening
14b Second opening
16 Inner channel
Spindle
20a Front end section (of the spindle 20)
20b Rear end section (of the spindle 20)

50 Spindle gear
60 Motor
70 Motor carrier
80 Fixing means
90 Crash bolt
92 Head
100 Gap
130 Spindle nut
132 Basic body
134 Projection
136 Shoulder
230 Spindle nut
232 Basic body
234 Projection
236 Shoulder
330 Spindle nut
332 Basic body
336 Shoulder
338 Elastic means, buffer
430 Spindle nut
432 Basic body
436 Shoulder
438 Spring means, leaf spring
440 Buffer
S Spindle axis (of the spindle 20)
A Axis (of the fixing means)
x Longitudinal direction
y Transverse direction
z Vertical direction

The invention claimed is:

1. A longitudinal adjuster for a vehicle seat, comprising:
at least one pair of rails formed from a first rail and a second rail which is displaceable in the longitudinal direction relative to the first rail,
wherein the rails alternately engage around each other forming an inner channel,
wherein a spindle nut connected to the second rail and a spindle operatively connected to the spindle nut are arranged in the inner channel,
wherein a spindle gear which is drivable by a motor and interacts with the spindle is arranged at one end of the first rail,
wherein the spindle nut is fixed to the second rail in such a way that the spindle nut has a rotational degree of freedom,
wherein the spindle nut is connected to the second rail by a fixing device,
wherein a projection is provided in the region of the fixing device on a basic body of the spindle nut,
wherein the spindle nut is connectable to the second rail in an event of a crash by two crash bolts,
wherein the projection comprises a rib on a bottom of the spindle nut basic body, the rib located between two bolt apertures in the basic body, the rib providing a vertical gap between the basic body bottom and the second rail.

2. The longitudinal adjuster as claimed in claim 1, wherein the crash bolts are each passed through a first opening in the second rail.

3. The longitudinal adjuster as claimed in claim 1, wherein a radial gap is provided around each crash bolt, between the bolt and the second rail.

4. The longitudinal adjuster as claimed in claim 3, wherein a radial gap is provided around each crash bolt, between the bolt and the first openings in the second rail.

5. The longitudinal adjuster as claimed in claim 1, wherein the spindle nut is fixedly connected to the second rail by a centrally arranged fixing device, as viewed in the longitudinal direction.

6. The longitudinal adjuster as claimed in claim 1, wherein the spindle nut is pivotable about a substantially horizontal axis.

7. The longitudinal adjuster as claimed in claim 6, wherein the spindle nut is pivotal about an axis running parallel to a transverse direction.

8. The longitudinal adjuster as claimed in claim 1, wherein the rotation of the spindle nut is about a substantially vertical axis.

9. The longitudinal adjuster as claimed in claim 8, wherein the spindle nut rotates about an axis of the fixing device.

10. The longitudinal adjuster as claimed in claim 1, wherein the spindle nut moves in a vertical direction.

11. The longitudinal adjuster as claimed in claim 1, wherein the spindle nut pivots about a substantially horizontal axis along an imaginary connecting line between the two crash bolts.

12. The longitudinal adjuster as claimed in claim 1, wherein the spindle is mounted at a front end section of the spindle in the spindle gear and at a rear end section of the spindle in a rotary bearing of the first rail.

13. The longitudinal adjuster as claimed in claim 1, wherein the basic body of the spindle nut has, in the region of each of the crash bolts, a shoulder which defines a distance between a head of the respective crash bolt and the basic body.

14. A vehicle seat with the longitudinal adjuster as claimed in claim 1.

* * * * *